J. Price,
Cotton Press,
No. 1,426.        Patented Dec. 7, 1839.
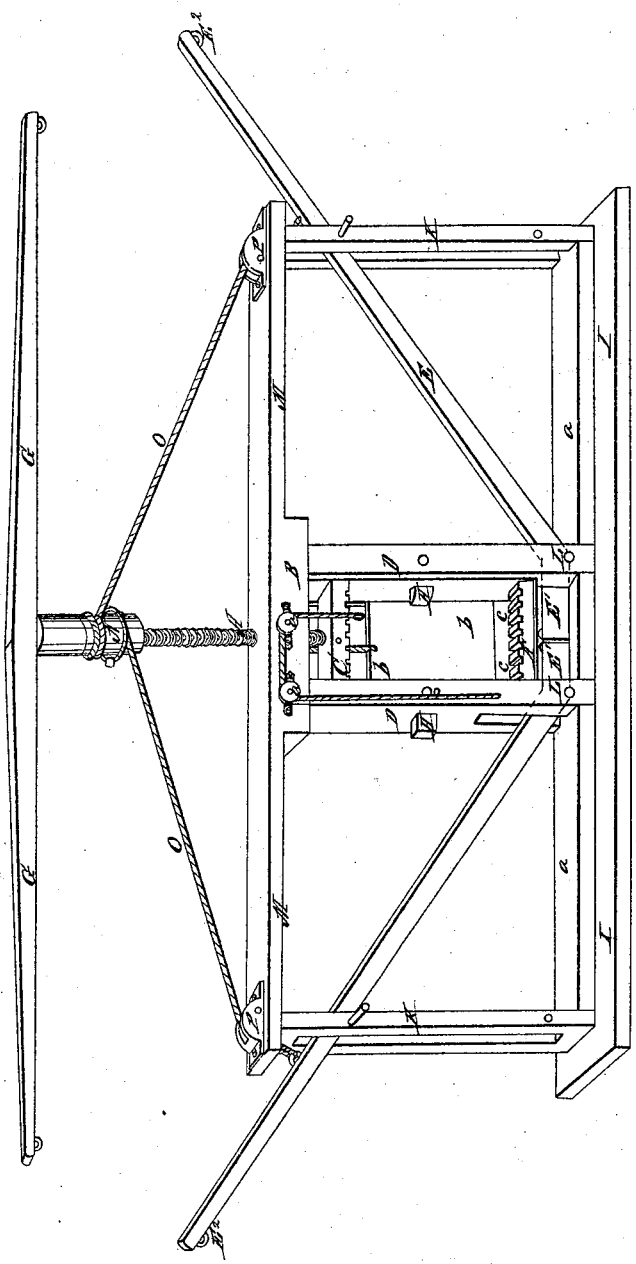

United States Patent Office.

JOHN PRICE, OF NASHVILLE, TENNESSEE.

IMPROVEMENT IN THE CONSTRUCTION OF COTTON-PRESSES.

Specification forming part of Letters Patent No. 1,426, dated December 7, 1839.

*To all whom it may concern:*

Be it known that I, JOHN PRICE, of Nashville, in the county of Davidson and State of Tennessee, have invented an Improved Press for the Purpose of Pressing Cotton; and I do hereby declare that the following is a full and exact description thereof.

In my press I have combined the action of the screw and of levers so as to obtain a press of great power, and which may be used with greater facility than such as have been heretofore constructed for the purpose of baling cotton. The power of the screw is first exerted so as to press the cotton as closely as can be readily done by that instrument, and the pressing is then completed by the action of levers arranged for that purpose, so as to raise a lower follower.

In the accompanying drawing, A A is a vertical screw working in a box adapted thereto in the cap B of the frame of the press.

C is a follower which is to be forced down by the screw between the cheeks D D in the ordinary manner.

E E are two levers, the short arms of which are placed below a lower follower, F, which they are to raise up after the action of the screw upon the cotton has been completed. These levers are to be operated upon in a manner to be presently described.

G G is a lever on the upper end of the screw A A, and by means of which it is to be forced down, as in other screw-presses. This lever may be drawn round by means of ropes at its ends, and in a bale of about four hundred pounds weight, measuring four feet and a half long and twenty inches square, the cotton may be readily pressed by means of the screw, so that it shall stand in the box to the height of thirty-five inches, leaving a further pressure of fifteen inches to be effected by the levers E E.

Through the cheeks D D of the press I make mortises, which are to receive two sliding blocks, H H, which slide freely in these mortises, and which I denominate "compression-blocks." While the screw is in use pressing the cotton, the compression-blocks are drawn out so that their inner ends shall be flush with the insides of the cheeks D D; but when the follower C has descended to the proper distance its upper surface will then be below the compression-blocks, which are to be slid in so as to catch upon it and sustain the follower against the action of the levers E E.

I I is the ground-sill of the press, which should be four feet or more below the surface of the ground, for the more conveniently charging the box for the purpose of packing.

K K are vertical guide-timbers, between the sides of which the levers E E are to rise and fall. L L are the fulcra of these levers, which are armed with iron made suitably strong to sustain the force to which they are to be subjected.

M M is a cap-plate of timber of the same length with the sill I I, and extending from K to K, to which they are framed.

The levers E' E' stand in the position shown in the drawing when the pressing commences, and remain so until the action of the screw is completed. Their short arms E' E' then stand horizontally, and the lower follower, F, rests upon them. When the cotton has been pressed by the screw, and the compression-blocks have been slid in upon the follower C, the levers E E are to be forced down by drawing upon their outer ends, $E^2 E^2$, by means of windlasses and ropes, by racks and pinions, tackle-blocks, or any of the known mechanical devices applicable to such purpose. The long and the short arms of the lever are so proportioned to the other as that by drawing the long arms down the short arms will force the follower F up fifteen inches in a press for the package of a bale of the size proposed. The bearing-points of the short arms of the levers should be furnished with friction-rollers.

The levers E E are raised up into the position shown in the drawing by the following device.

N is a tubular collar which surrounds the lower part of the head of the screw A, and will turn with it when a bolt or pin is inserted through the collar and into the screw-head, so as to connect the two; but the screw will turn within the collar when said bolt is removed.

O O are ropes attached to the collar N and to the levers E E, and passing over the pulleys at P P. On inserting the bolt above spoken of, the ropes will be made to wind round the collar N, and the levers E E will be raised. They may be held up by pins passing through the guide-pieces K K until it is necessary to draw them down, and when down they may be secured by pins in a similar manner.

Q Q are timbers placed upon the sill I I, serving to aid in keeping the vertical timbers of the press at their proper distances, and constituting, therefore, a part of the frame-work.

The box in which the cotton is to packed may be provided with doors and buttons in the ordinary manner; but I, in general, prefer to use sliding doors, the edges of which are received in grooves provided for them in the cheeks D D, and which may be drawn up by a rope passing over a pulley affixed to the cap-piece B, as shown at *a a*. Below the sliding door there should be a sliding board or shutter, the ends of which enter the same grooves with the sliding door. This, when down, incloses the lower follower, and rises a little way above it, keeping the said follower in place when the sliding doors are hoisted.

The sliding door and shutter are not represented in the front view of the press, as they would hide the followers; but *b b* show it at the back extending down to *c c*, which is the top edge of the sliding shutter inclosing the lower follower above named.

It has heretofore been the uniform practice to fasten cotton-bales by means of ropes; but for these I substitute hoop-iron, which unites the valuable properties of great facility in use, economy, and security. The hoops are inserted into grooves in the baling-box in the same way as rope, being first punched ready for riveting.

Having thus fully described my press for cotton, what I claim therein, and desire to secure by Letters Patent, is the manner in which I have combined the power of the screw and the levers—that is to say, I claim—

The first pressing by means of the screw, and then securing of the upper follower by means of the compression-blocks, and the completing of the operation of pressing by the two levers acting upon the lower follower in the manner described, said levers being drawn down by any adequate power, the particular combination of the swivel-collar, and its appendages for raising said levers.

JOHN PRICE.

Witnesses:
 THOS. P. JONES,
 W. THOMPSON.